United States Patent [19]
Legris

[11] 3,967,838
[45] July 6, 1976

[54] BANJO TYPE PIPE UNIONS
[75] Inventor: Andre Legris, St-Maur, France
[73] Assignee: Societe Legris France S.A., France
[22] Filed: Aug. 15, 1974
[21] Appl. No.: 497,675

[30] Foreign Application Priority Data
Aug. 20, 1973 France .............................. 73.30167
Mar. 7, 1974 France .............................. 74.07818

[52] U.S. Cl. ................................. 285/190; 285/323
[51] Int. Cl.² ........................................ F16L 27/08
[58] Field of Search ........... 285/190, 323, 322, 275, 285/276

[56] References Cited
UNITED STATES PATENTS

| | | | |
|---|---|---|---|
| 2,400,658 | 5/1946 | Shepherd | 285/190 |
| 2,459,643 | 1/1949 | Hartley | 285/190 |
| 3,147,015 | 9/1964 | Hanback | 285/190 UX |
| 3,219,366 | 11/1965 | Franck | 285/190 |
| 3,402,253 | 9/1968 | McCracken | 285/190 X |
| 3,743,326 | 7/1973 | Courtot et al. | 285/323 |

FOREIGN PATENTS OR APPLICATIONS

| | | | |
|---|---|---|---|
| 1,476,291 | 2/1967 | France | 285/190 |
| 136,325 | 12/1919 | United Kingdom | 285/190 |
| 843,338 | 8/1960 | United Kingdom | 285/190 |

Primary Examiner—Andrew V. Kundrat
Attorney, Agent, or Firm—Bucknam and Archer

[57] ABSTRACT

A pipe union of the "banjo" type, comprising a body havng a first bore in which is located a quick fitting connecting member adapted to receive the end of a pipe, said first bore opening into a second bore axially substantially perpendicular to said first bore, and a connecting socket located in said second bore and defining a conduit communicating through at least one orifice with said first bore. The connecting socket may be common to several unions, and the provision of quick-fitting connecting members facilitates assembly.

10 Claims, 17 Drawing Figures

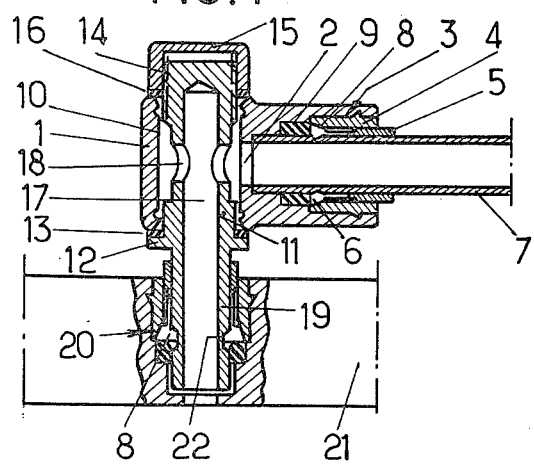
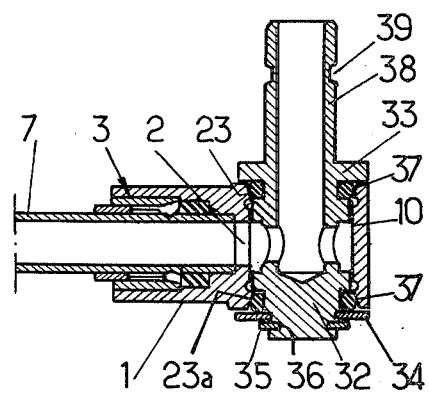
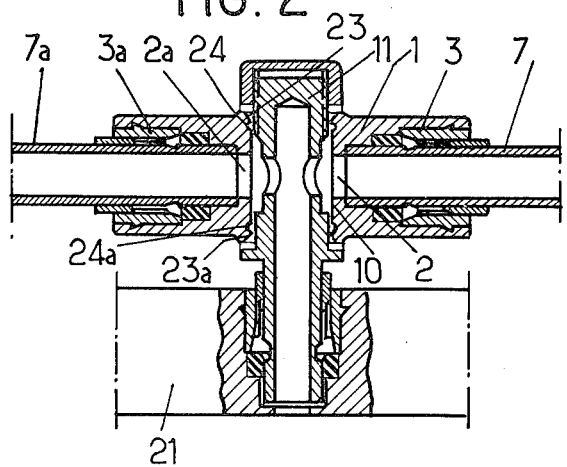
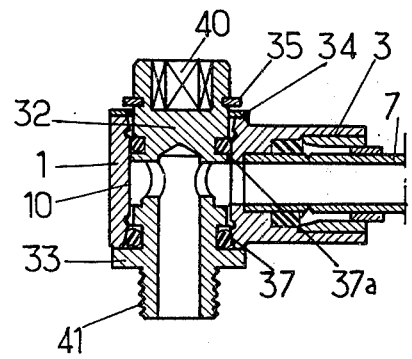
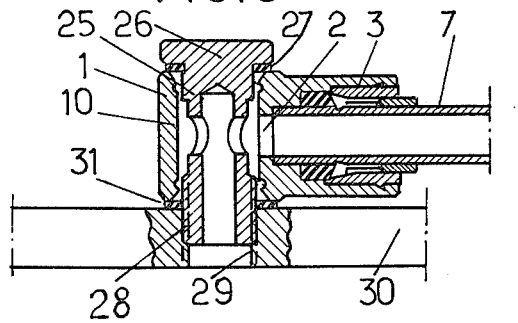

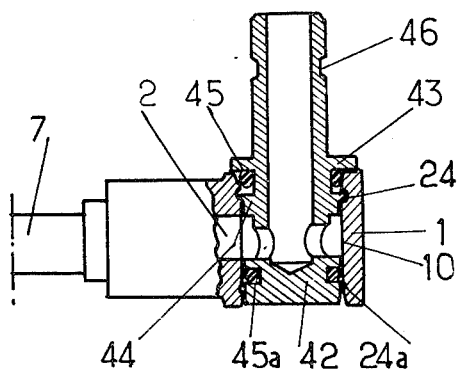
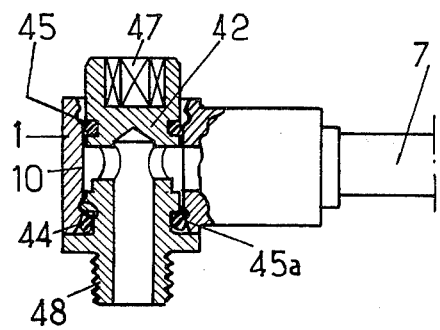
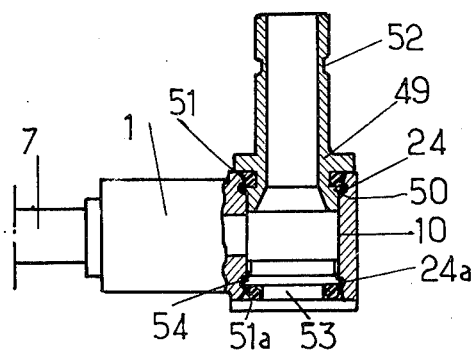
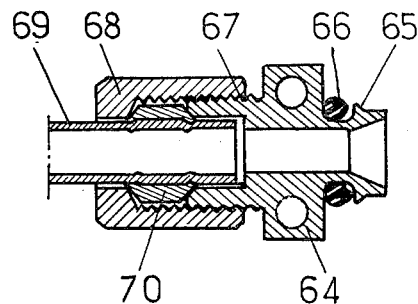
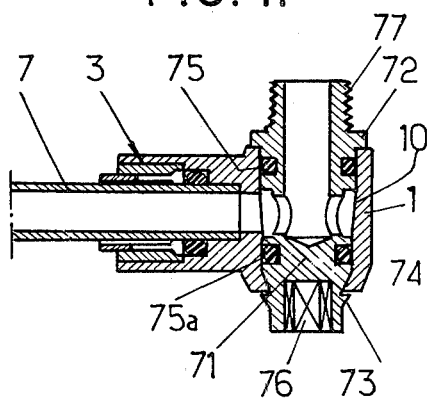

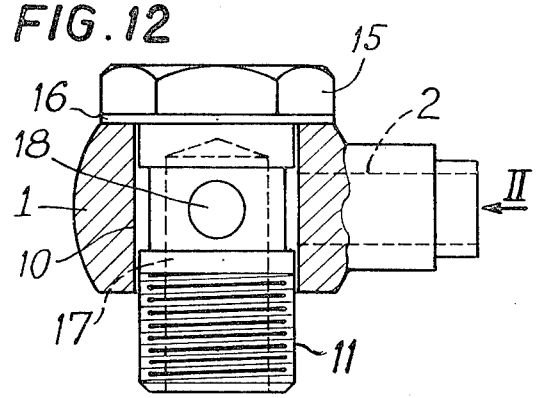
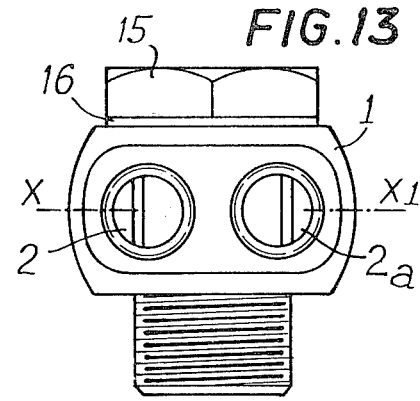
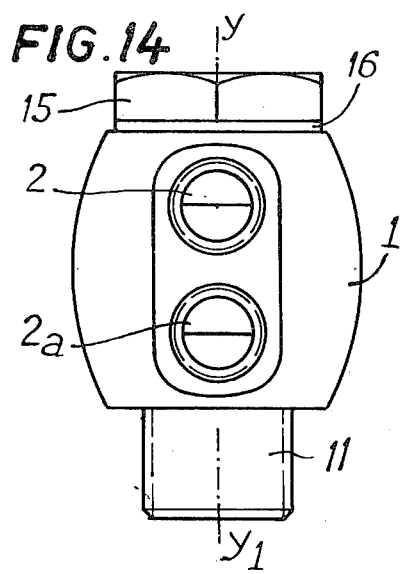
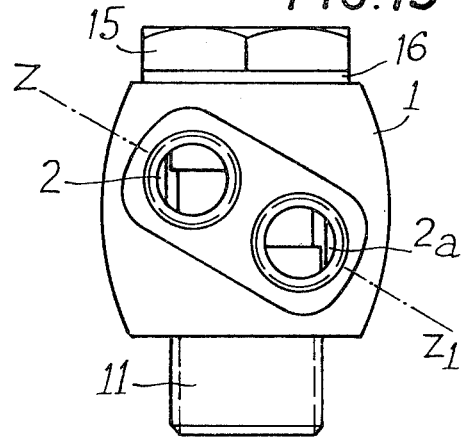
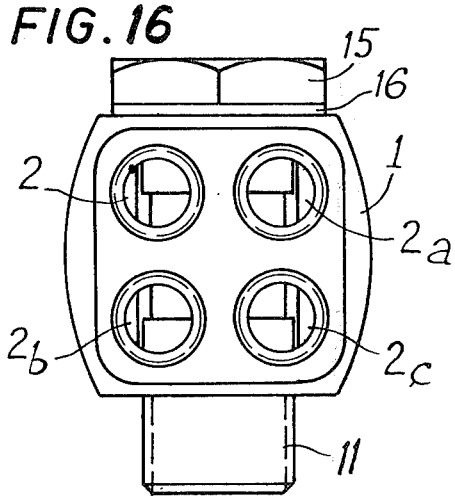
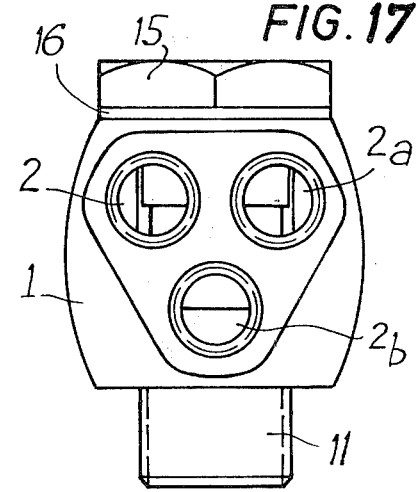

BANJO TYPE PIPE UNIONS

The present invention relates to "banjo" type unions.

It is known for the purpose of distributing fluids to utilize a type of pipe union enabling connections to be made at right-angles to a main body having limited vertical space requirements. These so-called "banjo" type unions having one or more outlets are mounted on the apparatus concerned by means of a hollow threaded connection adapted to secure the body of the union to the apparatus.

The tubes are generally secured to the "banjo" pipe union by conventional means, such as grooved ferrules, biconical connections or thread-cutting collars, which necessitates extensive connecting up operations involving high labour cost and in the course of which difficulties in placement arise should the space available be limited.

The "banjo" pipe unions are used to provide means for collecting and distributing fluids in several directions. To this end the unions are stacked upon one another and an elongate hollow threaded collector having as many throats and lateral apertures as there are bodies of the unions is threaded into the bore of the unions. The fluid which is supplied to the collector is distributed to each individual body of "banjo" pipe unions.

However, this arrangement is not very practical and is not easy to use, since each threaded collector can only accommodate a limited number of pipe unions which do not always correspond to the degree of utilization required. Moreover, it is impossible to assemble or mount different-sized pipe unions on the collector.

An object of the present invention is to obviate these drawbacks and to provide "banjo" type pipe unions adapted to be assembled and fitted quickly, and which enable means for collecting and distributing fluids of unlimited length to be produced, said means comprising pipe unions of different sizes which can be juxtaposed without difficulty. Such devices for collecting and distributing fluids may include fixing means to a wall or other support, shut-off means and threaded connecting means.

According to the present invention there is provided a pipe union of the "banjo" type, comprising a body having a first bore in which is located a quick fitting connecting member adapted to receive the end of a pipe, said first bore opening into a second bore axially substantially perpendicular to said first bore, a connecting socket located in said second bore and defining a conduit communicating through at least one orifice with said first bore.

A quick fitting connecting member as referred to herein is a device enabling push-in fitting and securing of a pipe such as the "quick-fix" device described in French Pat. No. 69 17.467.

The invention will now be described by way of example with reference to the accompanying drawings, in which:

FIG. 1 is a sectional view of a pipe union mounted upon a support and provided with "quick-fix" connections;

FIG. 2 is a sectional view of a similar pipe union on which two tubes are assembled;

FIG. 3 is a sectional view of a pipe union screwed to a support;

FIG. 4 is a sectional view of another embodiment of a pipe union;

FIG. 5 is a sectional view of a pipe union including a blind recess for moving the socket;

FIG. 6 is a sectional view of a pipe union having a socket held in position by a projecting ridge;

FIG. 7 is a sectional view of a socket similar to that shown in FIG. 6, but with a blind recess for moving the socket;

FIG. 8 is a sectional view of a pipe union comprising a half-socket and a plug;

FIG. 9 is a sectional view of a connecting member which is threaded for mounting on a tube;

FIG. 11 is a sectional view of another embodiment of pipe union with a threaded ferrule;

FIG. 12 is a sectional side view of a pipe union having two bores in a horizontal plane;

FIG. 13 is a view of the pipe union of FIG. 12 in the direction of the arrow II of said Figure;

FIG. 14 is a similar view to that of FIG. 13 the bores being in vertical superposition;

FIG. 15 is a similar view to that of FIG. 13, the bores being arranged on an inclined axis;

FIG. 16 is a view of a pipe union having four bores;

FIG. 17 is a view of a pipe union having three bores.

Figure 10:
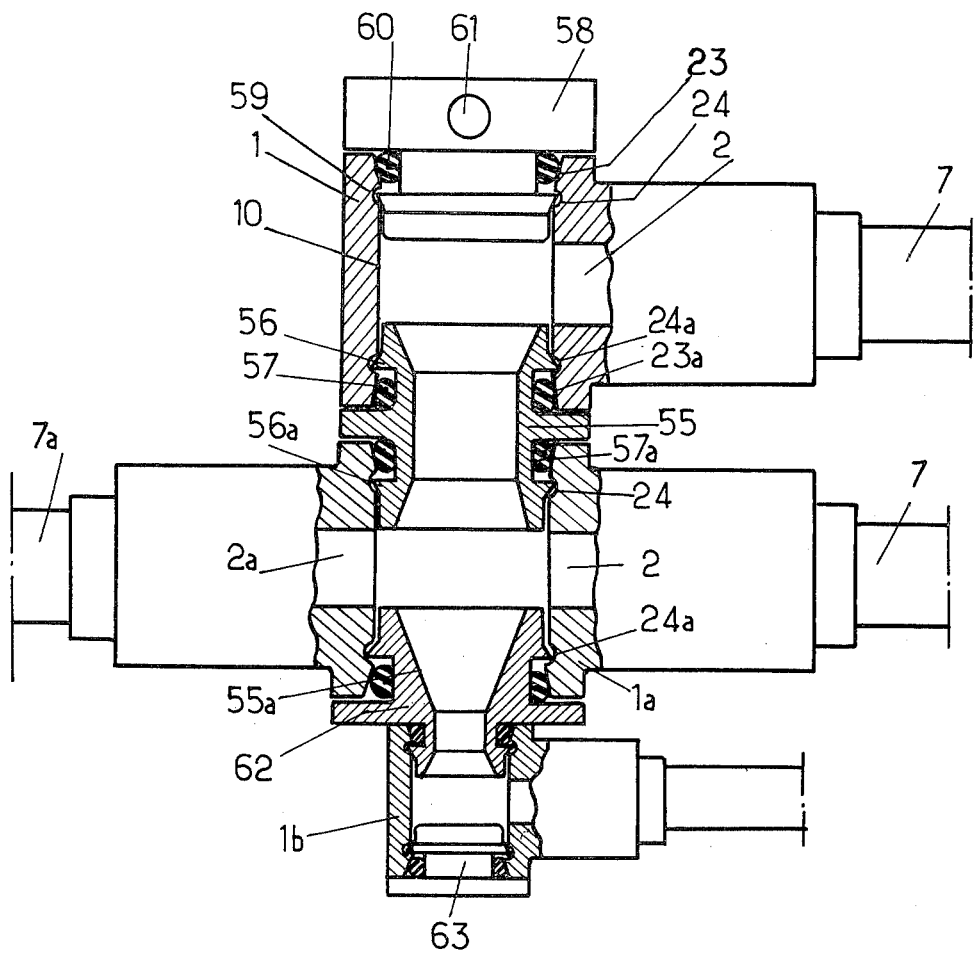
FIG. 10 is a sectional view of an embodiment of a collecting device with pipe unions according to the invention.

Referring to FIG. 1, a pipe union of the "banjo" type is shown comprising a body member 1 having a first bore 2 in which is mounted a "quick-fix" pipe union device 3 of the type described in French Pat. No. 69 17 467 and comprising a collar 4 in which is mounted a flexible clip 5 having several jaws 6 adapted to grip the wall of a tube 7 which is to be connected up, the collar 4 having a diverging zone 8 located on the inside of the union, in order to squeeze together the jaws of the clip 5 and a toroidal seal 9 thus preventing leakage between the tube 7 and the pipe union 3.

The first bore 2 opens into a second bore 10, the axis of which is perpendicular to that of the first bore 2, said second bore 10 housing a socket 11 having a shoulder 12 which is in bearing contact through a flat sealing ring 13 against the body member 1, and the other end of which consists of a threaded portion 14 on which is screwed a cap 15 bearing against the body portion by means of a sealing ring 16. The socket 11 provides an internal conduit 17 which communicates through orifices 18 with the first-mentioned bore 2 and which is extended by a ferrule 19 engaging with a "quick-fix" device 20 of the type described above, said socket being mounted in a supporting member 21. The ferrule 19 is provided with a recess 22 in which the jaws 8 of the "quick-fix" device 20 engages.

There is shown in FIG. 2 a pipe union similar to that of FIG. 1 in which the body member includes two bores 2, 2a accommodating two "quick-fix" devices 3, 3a in which are mounted tubes 7, 7a, the bores 2, 2a opening into the second bore 10.

The ends 23, 23a of the second bore 10 are chamfered see also (FIG. 10) and have two recesses 24, 24a the function of which will be described subsequently.

Another embodiment of pipe union is shown in FIG. 3, in which one end of a socket 25 is in the form of a head member 26 which is in bearing contact against the body member 1 through a flat ring seal 27 whilst the other end has a threaded portion 28 which is mounted in a tapped hole 29 of a support member 30 on which the body member 1 is in bearing contact by means of a flat ring seal 31.

A pipe union is shown in FIG. 4 in which one part of the socket 32 has a shoulder member 33 which is in bearing contact against the body member 1 whilst another part of the socket is provided with a washer 34 which is in bearing contact against the body member 1, said washer being retained by an elastic split ring 35 which engages in a groove 36 in the socket 32.

Both ends of the socket 32 are equipped with toroidal seals 37, 37a which are in bearing contact against the chamfered openings 23, 23a of the second bore 10. One end of the socket 32 is extended in the form of a ferrule 38 having a recess 39 adapted to be engaged by a "quick-fix" device 20 as shown in FIG. 1.

FIG. 5 shows a pipe union in which the socket 32 is mounted in the same fashion as in FIG. 4; however, one end of said socket has a multi-sided blind recess 40, and particularly a hexahedral recess adapted to receive and engage with a tool for rotating the socket 32.

The other end of the socket 32 is in the form of a threaded ferrule 41 to enable it to be fixed on a supporting member as shown in FIG. 3.

FIG. 6 shown another embodiment of pipe union in which one end of the socket 42 has a shoulder or flange 43 through which it is in bearing contact with the body member 1 which is of semi-rigid material.

The socket 42 fits into the bore 10 wherein it is retained by a circular ridge 44 engaging in a recess 24 provided in the bore 10. Toroidal seals 45, 45a are located between the socket and the body member 1 within the space provided by the bore 10.

One end of the socket 42 is extended to form a ferrule having a recess 46 to accommodate a "quick-fix" device.

FIG. 7 shows a union in which the mode of mounting the socket 42 is similar to that of FIG. 6 except that one end of the socket 42 has a multi-sided blind recess 47 adapted to receive and engage with a tool for rotating the socket 42. The other end of the socket 42 is in the form of a threaded ferrule 48 for the purpose of mounting in a tapped hole of a support member.

FIG. 8 shows a union including a body member 1 of semi-rigid material in one end of which is mounted a half-socket 49 having a circular ridge 50 engaging in a groove 24 in the body member 1, and including a toroidal seal 51. The half-socket 49 is extended to form a ferrule with a recess 52 adapted to engage with a quick fix device. The other end of the bore 10 of the body member 1 is closed by a plug 53 equipped with a circular ridge 54 engaging in a recess 24a, leakage being prevented as in the preceding case be means of a toroidal seal 51a.

FIG. 10 shows an embodiment of a collector comprising three pipe union bodies 1, 1a, and 1b of different sizes held together by connecting sockets 55, 55a and having at each end circular ridges 56, 56a engaging in the grooves 23a, 24a of the union body members 1, 1a. Toroidal seals 57, 57a ensure that the joints between the union bodies 1, 1a and the connecting socket 55 are liquid-tight. A plug 58 provided with a circular ridge or flange 59 and a toroidal seal 60 provides for the closure of the bore 10 of the union body 1, said plug 58 being provided with a fixing hole 61.

The union bodies 1a and 1b, which are of different sizes, are linked by means of a connecting socket 62 of similar design to the socket 55, exept that it has a smaller ferrule on the side facing the union body 1b.

The body 1b is closed by a plug 63 of similar design to the plug 58.

FIG. 9 shows a connecting socket 64 one end of which has a circular ridge 65 adapted to be engaged in a groove or recess 23, 23a in the body 1 of the pipe union and a toroidal seal 66.

The other end of the socket 64 includes an externally threaded portion 67, which could equally well be provided internally, on which is screwed a threaded sleeve 68 engaging with the end of a tube 69 on which is mounted a biconical sleeve 70. This arrangment enables alternative forms of link to be set up between the pipe union and any desired assembly on a tube.

FIG. 11 shows another embodiment of a pipe union in which one end of the socket 71 is provided with a shoulder piece 72 which bears against the union body 1 whilst the other end has an external circular ridge 73 which is a close fit around the constricted rim portion 74 of the body 1. Toroidal seals 75, 75a are mounted in the recess provided in the socket 71.

One end of the socket 71 is provided with a many-sided blind hole or recess 76 for the purpose of effecting rotation of the socket, the other end of which is extended in the shape of a threaded ferrule 77. It is also possible to provide a recessed ferrule on the socket as shown in FIG. 1 which is adapted to engage with a "quick-fix" device.

FIGS. 12 to 17 relate to special embodiments of pipe union in which the union body houses several bores adapted to receive the quick fix devices. This arrangement enables several tubes to be connected easily to the same pipe union and also to act as feed pipes.

FIGS. 12 and 13 show a pipe union comprising, as in the foregoing, a body 1 housing a bore 10 in which is mounted a socket 11 having a head 15 which bears against the body 1 through a joint 16.

The socket 11 has an internal passage 17 which communicates by orifices 18 with the bore 10 of the body into which open two bores 2, 2a arranged at right angles to the bore 10. These bores 2, 2a are provided with "quick-fix" pipe union devices as described in French Pat. No. 69 17 467.

In the embodiment shown in FIG. 13, the axes of the bores lie in a horizontal plane $X—X_1$.

According to another embodiment shown in FIG. 14, the axes of the bores 2, 2a lie in a vertical plane $Y—Y_1$.

According to yet a further embodiment shown in FIG. 15, the axes of the bores 2, 2a are located on an inclined axis $Z—Z_1$.

FIG. 16 shows a pipe union comprising four bores 2, 2a, 2b, 2c including "quick-fix" devices, the axes of the bores being disposed quadrilaterally.

FIG. 17 shows a pipe union having a body provided with three bores 2, 2a, 2b, the axes of which are disposed triangularly.

It will be understood that various modifications may be made by persons skilled in the art, in the devices or methods which have been described herein purely by way of example, without departing from the scope of the invention.

I claim:
1. A pipe union of the banjo type, comprising a body having at least one first bore in which is located a quickfitting connecting member adapted to receive the end of a pipe, said first bore opening into a second bore whose axis is perpendicular to that of the first bore and in which is pivotably mounted a connecting socket having a conduit in communication through at least one orifice with the first bore, said socket having a recess in which are engaged jaws of a flexible clip mounted in a collar secured in a supporting member, said collar having a diverging zone, disposed towards the interior of the union, for squeezing together the jaws of the clip and a toroidal seal preventing leakage from said socket and the union.

2. A pipe union according to claim 1, wherein one end of the socket includes a shoulder member by means of which it is in bearing contact with the body of the union, said body being of semi-rigid material, and said connecting socket being held in position by at least one ridge provided on the socket which engages in a groove provided in the bore, toroidal seals being locted between the socket and the union body.

3. A pipe union according to claim 1, wherein the union body is semi-rigid material and receives from one side in the second bore with interposition of a torroidal joint a half-socket provided with a recessed ferrule, said half-socket being in bearing contact against the body of by means of a shoulder piece, said socket having a ridge adapted to engage in a groove of the bore, and the other end of said bore being closed by a plug which includes a ridge or flange engaging in another groove of the bore, with interposition of a toroidal seal.

4. A pipe union according to claim 1, wherein the internal edges of the ends of said second bore are chamfered, said bore also having two internal recesses or grooves situated on either side of the axis of the first bore.

5. A pipe union acording to claim 1, wherein the end of the connecting socket has a shoulder member which bears by means of a sealing ring against the body of the union and the other end has a threaded portion on which is screwed a cap in bearing contact through a sealing ring against the body said socket including a ferrule having a recess adapted to engage in a quick fitting connecting member.

6. A pipe union according to claim 1, wherein one end of the connecting socket includes a head portion which is in bearing contact against the body of the union by means of a sealing ring, the other end including a threaded portion which is mounted in a tapped hole of a supporting member with which the body is in bearing contact through a sealing ring.

7. A pipe union according to claim 1, wherein the quick fitting connecting member includes a sleeve in which is mounted a flexible clip having several jaws adapted to engage against the wall of the pipe to be connected up or in the recess of a ferrule, said sleeve having an outwardly diverging zone towards the interior of the union body for the purpose of squeezing together the jaws of the clip, and a toroidal seal for preventing leakage between the tube and the pipe union.

8. A pipe union according to claim 1, wherein the body of the union is provided with a plurality of bores in each of which is located a quick fitting device adapted to receive the end of a pipe.

9. A pipe union according to claim 1, wherein one end of the connecting socket includes a shoulder member which is in bearing contact with the union body, the other end being in engagement with a washer in bearing contact with the body of the union, said washer being held by a locking device engaging in a groove in the socket, both ends of said socket being provided with a toroidal seal which is in bearing contact with internally chamfered ends of the second bore, and said socket including a ferrule having a recess adapted to engage with a quick fitting connecting member.

10. A pipe union according to claim 9, wherein the locking device and the connecting socket includes a multisided blind hold or recess to enable it to be rotated, and at the other end an external threaded ferrule.

* * * * *